Figure 1:
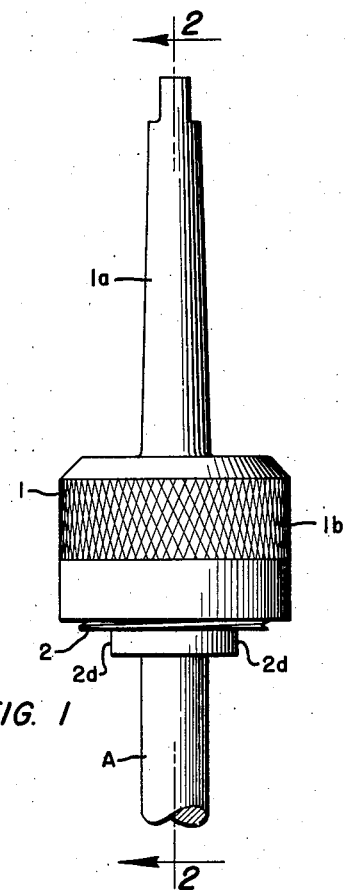

May 3, 1949.   W. G. SHERMAN   2,468,946
CHUCK
Filed Nov. 13, 1945

INVENTOR.
WILBUR G. SHERMAN
BY
A. B. Bowman
ATTORNEY

Patented May 3, 1949

2,468,946

UNITED STATES PATENT OFFICE 2,468,946

CHUCK

Wilbur G. Sherman, San Diego, Calif., assignor to Accurate Tool and Engineering Company, San Diego, Calif., a copartnership Application November 13, 1945, Serial No. 628,158

8 Claims. (Cl. 279—48)

My invention relates to a drill chuck more particularly for use in connection with machine tools such as drill presses, lathes, drill motors or the like and the objects of my invention are:

First: To provide a drill chuck of this class having a resilient collar therein which engages drill shanks providing uniform contact therewith and affording a certain amount of tortional resilience in the connection of the drill therewith.

Second: To provide a drill chuck of this class in which broken drills may be held in drilling operations.

Third: To provide a drill chuck of this class which accurately holds drills which have already been burred in connection with conventional chucks.

Fourth: To provide a drill chuck of this class which does not burr drill shanks.

Fifth: To provide a drill chuck of this class having a conical recess therein arranged to center various size drills at their ends.

Sixth: To provide a drill chuck of this class having a resilient collar therein which may be changed to accommodate various size drills.

Seventh: To provide a drill chuck of this class in which the drill is held by a resilient collar permitting resilient deflection of drills when improperly aligned with drill bushings whereby the drill conforms with the axis of the bushing and does not become jammed therein and broken.

Eighth: To provide a drill chuck of this class which when started directly into the work for drilling a hole therein drills a hole with a minimum amount of taper.

Ninth: To provide a drill chuck of this class having a resilient collar therein which dampens noise transmitted by the drill when rotating in connection with the work.

Tenth: To provide a drill chuck of this class having a resilient collar arranged to be compressed within the chuck casing wherein a rotating cup engages the opposite end of the resilient collar from the screw threaded retainer in connection therewith providing ease of rotation of said resilient collar when being compressed.

Eleventh: To provide a drill chuck of this class in which drill shanks are readily fixed therein by very light pressure in connection with the retainer in engagement with the resilient collar about said drill shank.

Twelfth: To provide a drill chuck of this class which is very simple and economical of construction, efficient in its action and which will not readily deteriorate or get out of order.

Figure 2:
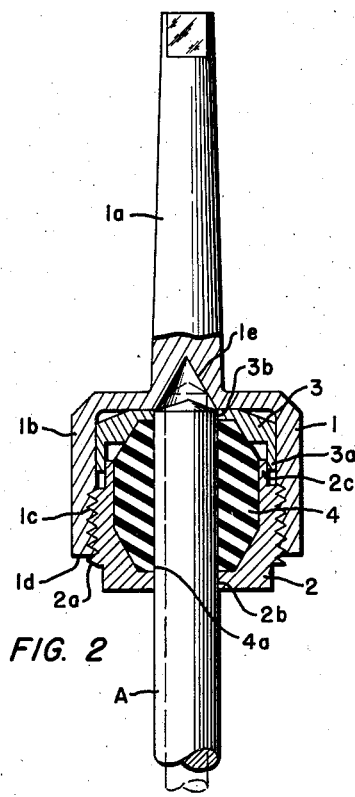
Figure 3:
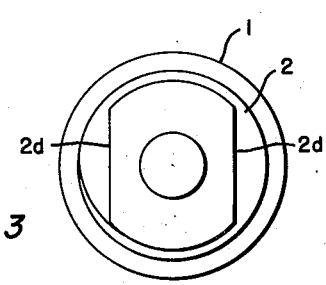
Figure 4:
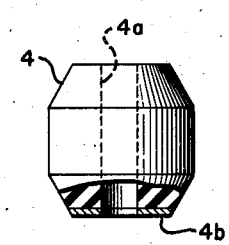

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, forming a part of this application in which:

Fig. 1 is a side elevational view of my drill chuck showing fragmentarily by solid lines a drill shank in connection therewith. Fig. 2 is a longitudinal sectional view taken from the line 2—2 of Fig. 1 showing portions in elevation and further showing fragmentarily by solid lines a drill shank in connection with my drill chuck. Fig. 3 is a lower end view of my drill chuck. And Fig. 4 is a side elevational view of the resilient collar of my drill chuck.

Similar characters of reference refer to similar parts and portions throughout the several views of the drawing.

The chuck casing 1, retainer 2, rotating cup 3, and the resilient collar 4 constitute the principal parts and portions of my drill chuck.

The chuck casing 1 is provided with a tapered shank portion 1a arranged to fit the arbors of the drill presses, lathes and other machine tools. This chuck casing 1 is provided with a cup shaped casing portion 1b having internal screw threads 1c at the lower open end portion 1d thereof, as shown best in Fig. 2 of the drawing. The retainer 2 is provided with external screw threads 2a adapted to engage the internal screw threads 1c of the chuck casing 1. This retainer 2 is provided with a drill shank receiving opening 2b in its lower end and is substantially cup-shaped as shown in Fig. 2 of the drawing. This retainer 2 at its upper end is provided with a telescopic skirt portion 2c positioned inwardly of and in telescopic relation with the annular skirt portion 3a of the rotating cup 3 which is revolubly mounted in the upper enclosed end of the cup shaped portion 1b of the chuck casing 1, all as shown best in Fig. 2 of the drawing. The resilient collar 4, as shown in Fig. 4 of the drawing, is positioned in the cup shaped portion of the retainer 2, and is provided with a central bore 4a aligning with the drill shank receiving opening 2b of the retainer 2. The rotating cup 3 is provided with a drill shank receiving opening 3b aligning with the bore 4a of the resilient collar 4 and the drill shank receiving opening 2b of the retainer 2. The drill chuck casing 1 at its upper enclosed end is provided with a drill shank abutment portion 1e arranged to engage the upper end of the drill shank A for exerting pressure thereon when forcing the same into the work.

The operation of my drill chuck is substantially as follows:

The shank portion 1a of the chuck casing 1 is secured in connection with a drill press, lathe, or other machine tool, in the conventional manner. The drill shank A, as shown in Fig. 2 of the drawing, is inserted through the opening 2b of the retainer 2 through the bore 4a of the resilient collar 4 and the opening 3b in the rotating cup 3 and the inner end of the drill shank A is abutted in the conical recess abutment portion 1e of the chuck casing 1. It will be here noted that this conical recess abutment portion 1c automatically aligns various sized drills in connection therewith as shown in Fig. 2 by dash lines. The flats 2d of the retainer 2 are then engaged and the retainer 2 is thereby rotated in its screw threaded relation with the chuck casing 1 moving the retainer 2 longitudinally into the chuck casing 1 compressing the resilient collar 4 against the rotating cup 3 which rotates with the retainer 2 during compression. When the retainer 2 is thus adjusted to compress the resilient collar 4 about the drill shank A, the bore 4a of the resilient collar 4 tends to reduce in diameter due to the displacement thereof under compression. Thus uniform engagement of the outer side of the drill shank A is accomplished by simply rotating the retainer 2 in its screw threaded relation with the chuck casing 1. It will be noted that the skirt portions 2c and 3a of the retainer 2 and the rotating cup 3 respectively are shown best in Fig. 2 of the drawing. The resilient collar 4 when properly compressed in connection with the drill shank A provides a certain amount of torsional resilience in driving the drill shank A when forcing the same rotatively into the work.

When using reduced diameter drills in the recess 1e, the collar 4 as shown in Fig. 4 is provided with a washer 4b bonded on one end boring a hole therein conforming to the reduced diameter drill preventing compression of the collar outwardly of the retainer opening 2b around the reduced diameter drill.

It will be here noted that the inner end of the drill shank A rests in the conical recess abutment portion 1e of the chuck casing 1 for positive engagement and compression of the drill shank A during drilling or other operations.

Though I have shown and described a particular construction, combination and arrangement of parts and portions, I do not wish to be limited to the particular construction, combination and arrangement but desire to include in the scope of my invention the construction, combination and arrangement substantially as set forth in the appended claims.

Having thus described my invention, what I claim as new and desire to secure by Letters Patent is:

1. In a chuck of the class described the combination of a chuck casing having an extending shank portion and a hollow cup shaped portion, a retainer adjustably secured in connection with said cup shaped portion movable longitudinally of the axis thereof and a resilient collar in said cup shaped portion inwardly of said retainer having a central bore therethrough, a rotating cup positively abutted in said cup shaped portion of said chuck casing engaging the opposite end of said resilient collar from said retainer and providing a rotatable bearing for said collar in said chuck casing, said retainer and said rotating cup being in telescopic relation with each other at their open ends.

2. In a chuck of the class described the combination of a chuck casing having an extending shank portion and a hollow cup shaped portion, a retainer adjustably secured in connection with said cup shaped portion movable longitudinally of the axis thereof and a resilient collar in said cup shaped portion inwardly of said retainer having a central bore therethrough, a rotating cup positively abutted in said cup shaped portion of said chuck casing engaging the opposite end of said resilient collar from said retainer and providing a rotatable bearing for said collar in said chuck casing, said retainer arranged in screw threaded relation with said cup shaped portion of said chuck casing, and having a central opening therein aligning with the bore of said resilient collar, said retainer and said rotating cup being in telescopic relation with each other at their open ends.

3. In a chuck of the class described the combination of a chuck casing having an extending shank portion and a hollow cup shaped portion, a retainer adjustably secured in connection with said cup shaped portion movable longitudinally of the axis thereof and a resilient collar in said cup shaped portion inwardly of said retainer having a central bore therethrough, a rotating cup positively abutted in said cup shaped portion of said chuck casing engaging the opposite end of said resilient collar from said retainer and providing a rotatable bearing for said collar in said chuck casing, said retainer arranged in screw threaded relation with said cup shaped portion of said chuck casing, and having a central opening therein aligning with the bore of said resilient collar, said rotating cup having a central opening therein aligning with the bore of said resilient collar, said chuck casing having a drill abutment portion aligning with the bore of said resilient collar.

4. In a drill chuck of the class described the combination of a chuck casing having a shank portion and a cup shaped portion, a cup shaped retainer arranged in screw threaded relation with the cup shaped portion of the chuck casing having its open end inwardly of said cup shaped portion of said chuck casing, and a resilient collar having a central bore therein positioned intermediate said retainer and the enclosed side of the said cup shaped portion of said chuck casing said collar freely rotatable in said chuck casing and positively abutted at one end against movement longitudinally of the axis of said casing, an opposed cup shaped rotating cup having its open end facing the open end of said retainer and in engagement with said resilient collar, both said retainer and said rotating cup having central openings therein aligning with the bore of said resilient collar said retainer and said rotating cup being in telescopic relation with each other at their open ends.

5. In a drill chuck of the class described the combination of a chuck casing having a shank portion and a cup shaped portion, a cup shaped retainer arranged in screw threaded relation with the cup shaped portion of the chuck casing having its open end inwardly of said cup shaped portion of said chuck casing, and a resilient collar having a central bore therein positioned intermediate said retainer and the enclosed side of the said cup shaped portion of said chuck casing said collar freely rotatable in said chuck casing and positively abutted at one end against movement longitudinally of the axis of said casing, an opposed cup shaped rotating cup having its open end facing the open end of said retainer and in engagement with said resilient collar, both said retainer and said rotating cup having central openings therein aligning with the bore of said resilient collar, said retainer having portions protruding from said chuck casing arranged to be engaged for rotating the same relatively to said chuck casing said retainer and said rotating cup being in telescopic relation with each other at their open ends.

6. In a drill chuck of the class described, the combination of a cup shaped chuck casing, a cup shaped retainer arranged in screw threaded relation with said chuck casing, a resilient collar having a central bore therein positioned intermediate said retainer, and the inside of said cup shaped chuck casing and a rotating cup positively abutted against movement longitudinally of said casing and bearing against the enclosed end of said chuck casing and engaging said resilient collar in opposed relation to said cup shaped retainer said retainer and said rotating cup being in telescopic relation with each other at their open ends.

7. In a drill chuck of the class described, the combination of a cup shaped chuck casing, a cup shaped retainer arranged in screw threaded relation with said chuck casing, a resilient collar having a central bore therein positioned intermediate said retainer, and the inside of said cup shaped chuck casing and a rotating cup positively abutted against movement longitudinally of said casing and bearing against the enclosed end of said chuck casing and engaging said resilient collar in opposed relation to said cup shaped retainer, said retainer and said rotating cup having central openings therein aligning with the bore of said resilient collar said chuck casing having a conical recess abutment portion aligning with the bore of said resilient collar and arranged to align the inner ends of various sized drills placed therein.

8. In a drill chuck of the class described, the combination of a cup shaped chuck casing, a cup shaped retainer arranged in screw threaded relation with said chuck casing and a resilient collar having a central bore therein positioned intermediate said retainer and the inside of said cup shaped chuck casing, said collar having a washer in engagement therewith adjacent said retainer and provided with an opening therein equal to the diameter of the central bore of said collar said collar freely rotatable in said chuck casing and positively abutted at one end against movement longitudinally of the axis of said casing said retainer and said rotating cup being in telescopic relation with each other at their open ends.

WILBUR G. SHERMAN.

REFERENCES CITED

The following references are of record in the file of this patent:

UNITED STATES PATENTS

| Number | Name | Date |
|---|---|---|
| 574,077 | Sellers | Dec. 29, 1896 |
| 1,011,975 | Lewis | Dec. 19, 1911 |
| 1,983,977 | Geiger | Dec. 11, 1934 |
| 2,310,405 | Dodge | Feb. 9, 1943 |

FOREIGN PATENTS

| Number | Country | Date |
|---|---|---|
| 851,759 | France | Jan. 15, 1940 |
| 122,174 | Great Britain | June 19, 1919 |